June 3, 1969      G. C. MAYFIELD      3,447,811
PISTON RING ASSEMBLY
Filed Aug. 12, 1966      Sheet 1 of 2
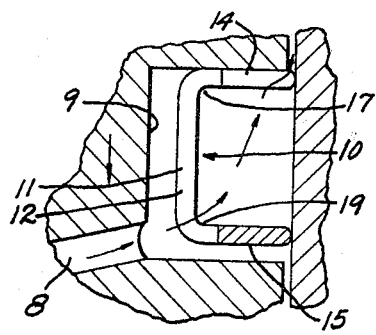
PRIOR ART   FIG. 1.
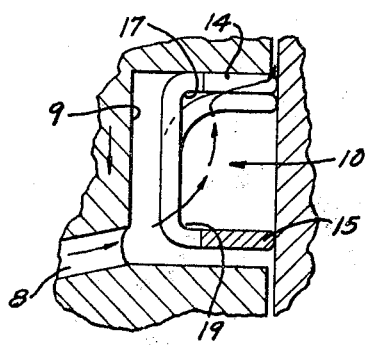
PRIOR ART   FIG. 2.
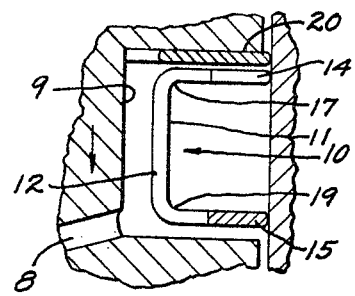
FIG. 3.
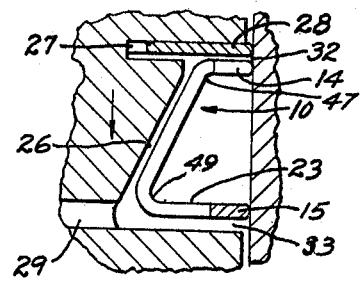
FIG. 4.
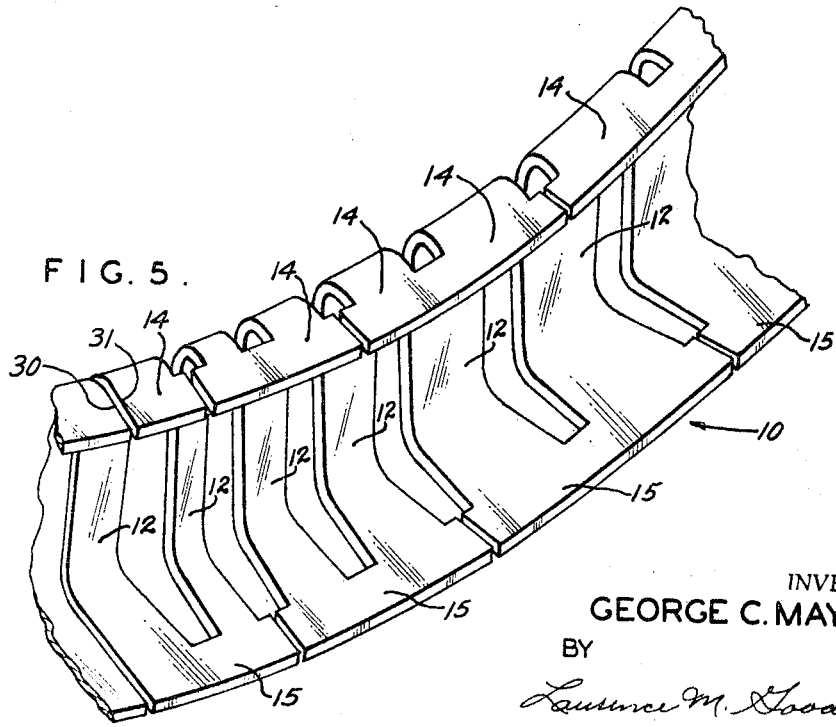
FIG. 5.
INVENTOR
GEORGE C. MAYFIELD
BY
Laurence M. Goodridge
ATTORNEY

United States Patent Office 3,447,811
Patented June 3, 1969

3,447,811
PISTON RING ASSEMBLY
George C. Mayfield, Richmond Heights, Mo., assignor to McQuay-Norris Manufacturing Company, St. Louis, Mo., a corporation of Missouri
Continuation-in-part of application Ser. No. 313,844, Oct. 4, 1963. This application Aug. 12, 1966, Ser. No. 594,951
Int. Cl. F16j 9/20
U.S. Cl. 277—193    4 Claims

ABSTRACT OF THE DISCLOSURE

Non-bottoming self-expansible oil ring for pistons having segmented top and bottom lands in which the segments of the respective lands are separated in axially staggered relationship, and the segments of each land are connected by struts of varying cross-section, and in which the radial dimension of one land is greater than that of the other.

---

This application is a continuation-in-part of Ser. No. 313,844, filed Oct. 4, 1963, now abandoned.

The present invention relates to radially slotted, circumferentially expansible and contractible spring piston ring elements and more particularly to an improvement in such elements which causes the piston ring to seat better, quicker and maintain a longer lasting sealing function.

This invention is hereinafter described by contrast with a particular type of ring construction which has become well known in the art, but the principles upon which this invention are based are applicable to similar kinds of piston ring elements. The particular well-known type of ring is a split spring ring of U-shaped section with axially spaced lands slotted in an alternate manner circumferentially from the cylinder-engaging edge of one land to the back of the opposite land, thereby to form slots in a staggered relation opening first in one land and then the other around the ring. Such a ring is simple in structure, and not too difficult to fabricate. It has the flexibility lengthwise to conform with considerable deviation of cylinder surface from true circular. It has flexibility crosswise to equalize the pressure between lands of the ring.

These reasons would seem to make such a ring outstanding as an oil control ring. But, this has been found not the case in many instances. In other words, it works well with the engine under load, but not well at part, or closed-throttle, when high suction in the cylinder occurs. Others have suggested that the fault must be with improper installation or with manufacturing tolerances. Of course, these are distinct possibilities, but all incidents of malfunction do not seem to verify these as the sole causes. Because no one apparently has discovered all of the reasons why, other more expensive ring assemblies with separate rings and an expander have been favored instead.

There is the possibility that some rings of this kind do not maintain their advantage of flexibility under all operating conditions. Accordingly, it is an object of this invention to provide a construction for split spring ring elements which will maintain flexibility under most operating conditions when compressed in a ring groove.

Certain indications of unusual wear have been observed which could be caused by vibration surging. Accordingly, it is one object of this invention to provide an improved ring element to minimize such surging.

There have been many other proposals made in the prior art to improve the oil sealing function of this type of piston ring without destroying its inherent flexibility. Some, for example, have proposed tabs bent to overlie the slots in the inner face of the lands of the ring so as to prevent the escape of oil through the slots. Certainly none of these has met with outstanding success. Accordingly, it is one of the objects of this invention to improve the sealing function of this slotted type of ring without interfering with its inherent flexibility.

Other objects and advantages of this invention will appear from the following detailed description which is in such clear, concise and exact terms, as will enable anyone skilled in the art to make and use the same when taken with the accompanying drawings, forming a part thereof, and in which:

FIG. 1 is a fragmentary transverse section through a piston, ring and cylinder wall illustrating the escape of oil past a slotted spring ring;

FIG. 2 is a view similar to FIG. 1 illustrating the path for the escape of oil in another form of slotted spring ring;

FIG. 3 is a fragmentary sectional view taken through a piston, ring and cylinder wall constructed in accordance with this invention;

FIG. 4 is a view similar to FIG. 3 of a modified form of the invention;

FIG. 5 is a fragmentary perspective view of a portion of the spring ring shown in FIG. 4;

Figure 6:
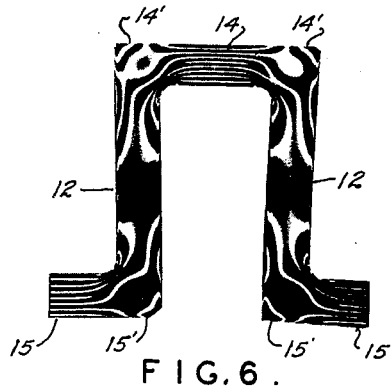
FIGS. 6 and 7 are views of different strut shapes for for a spring ring when subject to compressive strain under a photo elastic polariscope.

FIGS. 1 and 2, in the accompanying drawings, show a piston ring of the well-know kind above described, but of improved forms and illustrate a typical ring installation in a ring groove 9 of a piston which is provided with oil drainage openings 8. The ring 10 is a spring ring of generally U-shaped cross section and has a backbone structure 11 with side by side struts 12 which extend from an upper land segment 14 to a lower land segment 15. Struts 12 can be curved from end to end, but instead are here shown bent at 17 and at 19. This shape is merely arbitrary to provide a degree of clearance in the piston ring groove. The shape of the struts could be curved as long as manufactured working clearance with the bottom of the ring groove exists when the ring is in a compressed condition and centered in the ring groove.

As above stated, the oil sealing function of such a slotted, flexible spring ring under part throttle, or closed throttle operation of the engine can be improved, but this cannot be accomplished by tabs covering the gaps between segments inside the ring.

FIG. 1 illustrates schematically the fluid flow path which is open through the slots in the land of a slotted flexible spring ring. On the suction stroke of the piston, oil can follow this flow path, indicated by arrows, to escape by the piston. FIG. 2 is a schematic illustration in which the arrows indicate a fluid flow path which is open through the slots in a slotted flexible spring ring with tabs covering the slots between segments in the land. On the suction stroke of the piston, oil can follow this flow path to escape by the piston.

In the embodiment shown in FIG. 3, a ring or rail 20 (which may be of the wafer form shown in FIGURE 20 of my Patent 2,837,386) closes both paths shown in FIGS. 1 and 2. Rings 10 and 20 are manufactured to provide working clearance within the groove 9 and between the two rings 10 and 20 so that they are free to expand and contract in the ring groove in an independent manner. The outer peripheries of both rings 10 and 20 ride against the cylinder wall. Spring ring 10 retains all of its inherent flexibility and so performs its usual sealing function, but, at the same time, the gaps between segments 14 in the upper land are sealed off because ring 20 rides the cylinder wall and also closes the gaps between segments 14 from the cylinder wall radially inwardly.

On the suction stroke of the engine, inertia holds ring 20 against the upper side of ring groove 9 and the upper face of segments 14 of ring 10 against the lower face of ring 20. Since the rings 10 and 20 are held face to face by the inertia forces, oil cannot pass gaps between segments 14 of ring 10, instead it is trapped because the gaps between segments 14 are covered by ring 20. High suction above the piston developed during the suction stroke at closed throttle is isolated from the oil trapped by oil control ring 10 by sealing ring 20. Where the rings have clearance in the groove and are free to float, the rings act like valves to close on the down stroke of the piston and spring pressure is not required to press the top face of segments 14 against the bottom face of ring 20, or ring 20 against the upper face of the groove. In fact, spring pressure, acting axially on the rings, can cause the rings to bind in the ring groove and thereby defeat the very purpose the spring is intended to serve.

In accordance with the present invention, all of the advantages due to the highly flexible nature of oil control ring 10 are retained. On the other hand, one of the disadvantages inherent in the highly flexible (both axially and radially) slotted type of ring, as exemplified at 10 in the drawings, is definitely eliminated by adding an exterior ring seal wherein the seal is a kind which, as here, does not interfere with the usual flexing of the ring 10. The combination of the flexible type oil control ring 10 and the sealing ring 20 can be made and sold in sets, or individually, for the purpose of installation in a ring groove 9 of usual dimensions. When operating together as a set, the rings 10 and 20 retain all of the operating attributes of rings of these respective kinds. Ring 10 is highly flexible in its wiping action on the cylinder wall, and, therefore, efficient in this respect. Because of the described discovery, it is now possible to use the slotted, flexible type of ring combined with a sealing ring as the only oil control ring, whereas heretofore the flexible type ring would operate satisfactorily only in combination with other rings for the same purpose located in a separate ring groove above the flexible type ring.

In FIGURE 4, there is shown an installation involving a ring groove 26 which has a channel 27 for seatng the inner periphery of a split expansible and contractible piston ring 28 which may be of the same kind as ring 20 in the embodiment of FIGURE 3. The outer periphery of ring 28 protrudes from groove 26 to engage the cylinder wall. The groove 26 is also shaped to receive a slotted, flexible spring ring of the same general kind as 10 in FIGURES 1 and 3, but cross-sectionally differing therefrom in that the upper land 14 is of substantially less radial dimension (between bend 47 and the cylinder-engaging edge) than the radial dimension (between bend 19 and the cylinder-engaging edge) of the lower land 15, and the struts 12 are inclined radially outwardly from bottom to top. Oil drainage slots 29 are provided in the piston to connect with the bottom of ring groove 26. In this arrangement, the ring 28 performs not only an oil controlling function as described in connection with FIGURE 3, but also a function of sealing against blow-by. A working clearance is desirable at 32 between the rings 10 and 28 and at 33 between ring 10 and the bottom face of ring groove 26. The location of the inner periphery of ring 28 in channel 27 provides an additional seal because of the natural tendency of a ring to twist when contracted to operating diameter. Both rings 10 and 28 ride the cylinder wall, as in FIG. 3, but, in FIG. 4, the plain ring 28 has an oil sealing function not only for the slots, or gaps, between segments 14 of ring 10, but also an oil sealing and compression sealing function independent of ring 10 because of its mounting in channel 27. The differential in radial dimension between the upper (narrower) land 14 and the lower (wider) land 15 causes them to vibrate at different frequencies. When these different frequencies collide in the struts 12, energy is released which dislodges sludge accumulated there, and thus maintains the ventilation open for the passage of oil. When the struts 12 slope outwardly and upwardly from the wider land 15 toward the narrower land 14, the unit pressure exerted on the cylinder wall by the narrow land 14 is greater than that exerted by the wider land 15, and contraction (such as that which occurs at the bottom of the piston stroke in worn engines) of the land 15 tends to drive the land 14 toward the cylinder wall at the very time it is needed. Moreover, when the ring with inclined struts is mounted in a groove whose bottom slopes, as shown in FIGURE 4, and the above-described working clearance 32, 33 is provided, there is a reduction of the space between the struts and the groove bottom at the upper end of each stroke, and an enlargement of such space at the lower end of the stroke. This creates a pumping action which repeatedly flushes the oil from and to the space between the struts and the groove bottom as the flexible ring moves relative to the piston within the working clearance.

So far, this description has been directed merely to one aspect of the invention, that of providing an outer seal for a slotted, flexible spring ring to improve its oil control function at engine operating conditions where it has heretofore been inferior to multi-piece rings of a more expensive construction. There are still other manners in which the function of the slotted, flexible spring ring can be improved.

Anyone familiar with a piston ring of the kind above described recognizes that as a matter of fact flexibility in the ring is lost if it becomes compressed to the extent that the very narrow slots in the lands close in any portion of the ring. When the slots close in a given portion, that portion becomes relatively inflexible. Prior Patent 2,837,386 describes why and where this occurs in a ring whose ends abut. As this prior patent explains, "the several ring elements are made less flexible (under circumferential compression), in the increments thereof nearest the end abutment, than in the intermediate increments, by varying the pitch between the several notches. The same result may be accomplished in innumerable other ways with, or without, varying the pitch between notches." This patent described the more obvious ways of making the increments nearest the end abutment less flexible, such as by increasing the section of metal therein. It does not, however, state how the same can be obtained and still retain flexibility in the ring between segments nearest the end abutments. In other words, the teachings of the prior patent of adding metal to the sections in the segments of the ring, or decreasing their circumferential length, do not apply here because flexibility between circumferentially spaced cylinder engaging segments would be impaired.

To illustrate this fact, attention is directed to FIG. 6, which represents the results of a photoelastic investigation into stress distribution under compression as revealed by the photo elastic polariscope on a strut of constant cross-section. It is clear From FIG. 6 that the stress is concentrated in the circumferential segments 14 and 15 and at the corners 14' and 15'. The distortion is concentrated mostly at the corners because of high loading. Struts 12 are practically unstressed. Consequently, if the section of segments 14 and 15 are increased in cross-section (width), more metal is placed at the corners 14' and 15', and this will no doubt decrease the flexibility of the whole ring because it braces the corners against angular deflection with respect to the segments 14 and 15. Decreasing the pitch means simply decreasing the length of the segments and has the same effect as increasing the width.

Figure 7:
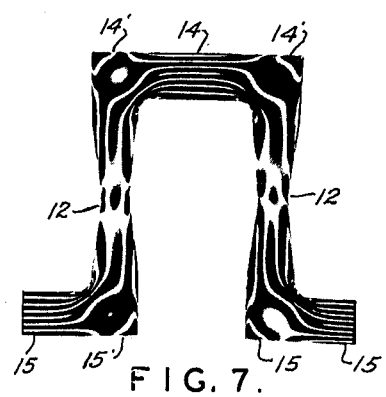

FIG. 7 represents results from the same investigation carried out on a strip of variable section in the struts rather than in the segments. According to the stress distribution pattern, stress in this configuration of strip is less in the segments 14 and 15 (note, wider spacing of stress lines than in FIG. 6), and now extends around the corners 14′ and 15′ and the full length of the struts 12. Since the stresses are distributed over a greater length of metal, the stresses will be reduced in degree proportionately, and the same effect (less distortion) has been produced as if the section of the land segments 14 and 15 had been increased, or the distance between struts (pitch) had been decreased, except that neither have been changed, and, consequently, the flexibility of the ring has not been decreased but actually increased (the struts are more flexible one way). Only the flexibility of section in circumferential compression has been decreased. Accordingly, where the section of the strut 12 is less than the section of the lands 14 or 15, a stress distribution pattern is obtained favorable to maintain uniform spaces between lands 14 and 15 as the ring is compressed. This in turn eliminates non-uniform radial loading due to closing of the gaps, or spacings, between segments 14 and 15 in certain portions of the ring 10 and not in others. When non-uniform radial loading due to closing of the gaps is avoided and distortion in the individual segments avoided, or at least minimized, the function of the spring ring is improved in all respects. This is true of the functioning of this type of ring considered by itself, but, more important, it is true of the functioning of the spring ring as a valve seat for the plain ring, or rail, which has been compared in function to a valve. The less distortion in the segments, the flatter the seat and the better the sealing action between the two rings.

Referring again to FIGS. 6 and 7, it will be equally apparent that in FIG. 7 the lines of stress are further separated at the corners 14′—14′ and 15′—15′ than the lines of stress shown in FIG. 6. Where there exists a less concentration of stress, there will be less distortion. With a strut of less section than a land, segments of the lands are not distorted at the corners and high loading is reduced. Furthermore, the spring frequency of the ring 10 can be made variable by the variation in the amount and distribution of metal in the struts to minimize surging. In the particular instance, the stress pattern results from both the relative size of the sections of metal in a strut as compared with land segments and from the variable section of the metal in the strut from end to end. Where it is desired to have a uniform division of forces between lands 14 and 15, then the struts 12 are symmetrical on either side of an imaginary center line of a blank for ring 10. It is possible to conceive of many modifications of structure which have a variation in the amount of metal in the struts circumferentially and yet are symmetrical in the amount of metal in the struts on either side of an imaginary center line of a ring blank to obtain a uniform division of spring forces between the top and bottom lands in the completed ring. Examples are shown in FIGS. 8 and 9.

Figure 8:
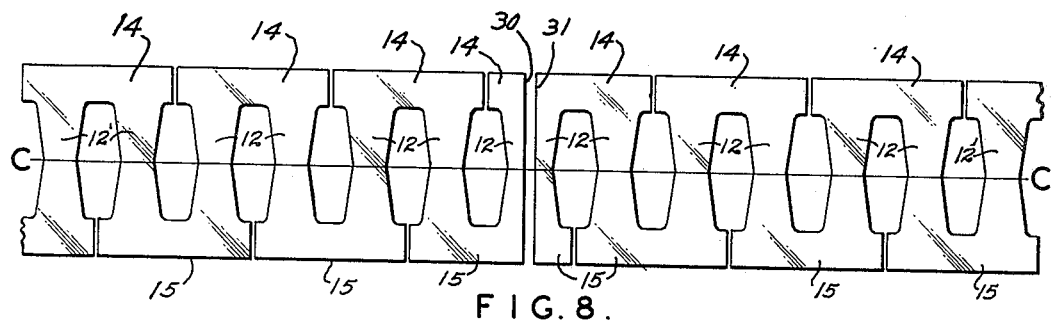
FIGS. 8 and 9 are blanks for a spring ring such as shown in FIGS. 3–5 showing two different patterns using variable section struts.

FIG. 8 shows opposite ends 30 and 31 of a blank bent end to end to illustrate one form of the piston ring 10, constructed as above described. The lands 14 and 15 are all the same length and width except for those adjacent the abutting ends 30 and 31 which are approximately half size. The struts 12 adjacent the abutting ends 30 and 31 are of variable section. Struts 12 at their minimum sections are preferably of less width than either the section thereof adjacent lands 14 or adjacent 15, and at their narrowest section are substantially the same width as struts 12′ which are located remote from the abutting ends 30 and 31.

Figure 9:
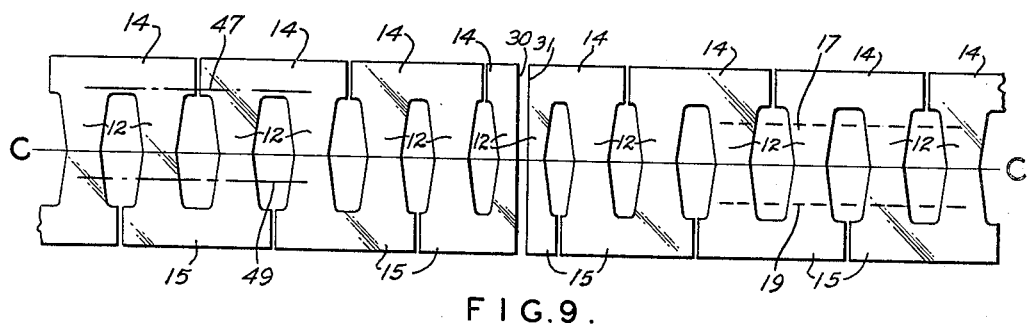

FIG. 9 also shows opposite ends 30 and 31 of a blank bent end to end to illustrate another form of the piston ring 10, constructed as above described. In this form the width of the struts 12 at their narrowest section remains constant, but the spacing between struts progressively increases from the smallest dimension adjacent abutting ends 30 and 31. At a point remote from the abutting ends, the struts become uniform in spacing. Each of the struts 12 is the same size and vary in section top to bottom in the same way, but the struts vary in spacing, or pitch, adjacent abutting ends 30 and 31.

Where uniform spring force is desirable, the struts are symmetrical in section on opposite sides of the imaginary center line C—C at least insofar as the amount of metal in each of the struts connecting with a given land 14 or 15. When an equal division of the spring froce between lands is not desired, then the section of the struts is variable to meet the required unequal division of the spring force between lands 14 and 15.

FIGURE 9 also shows, in dotted lines, the location of the bends 17 and 19 with respect to the center line C—C of the embodiment shown in FIGURE 3; and, in broken lines, the location of the bends 47 and 49 with respect to the center line C—C of the embodiment shown in FIGURE 4.

Changes in and modifications of the construction described may be made without departing from the spirit of my invention or sacrificing its advantages.

Having thus described the invention, what is claimed and desired to be secured by Letters Patent is:

1. An oil control piston ring for a piston having a ring groove with oil drainage passages comprising,
   (a) a flexible spring type oil ring of U-shaped section with axially spaced cylinder engaging lands slotted in an alternate manner circumferentially from the outer cylinder engaging edge of each land to the opposite land to provide relatively narrow gaps in staggered relation opening first in one land and then in the other around the ring and separating said lands into individual segments,
   (b) struts defined by spaced apertures, the circumferential dimension of said apertures at a line remote from both lands being substantially greater than at said lands, and said dimension progressively decreasing from said line toward both lands, said struts directly connecting a segment in one land with a segment in the other land,
alternate ones of said spaced apertures being connected to the gaps in one land and the intervening apertures connected to gaps in the other land, said apertures extending from a top land to a bottom land to define a U-shaped structure in which the legs of the U-shaped structure are struts and the bight of the U-shaped structure a part of one of said segments wider than said struts adjacent the junction between segments and struts, and said struts:
   (c) being longer than said part of said segment between struts; and
   (d) having opposite sides which progressively converge from a maximum cross-section at each of their conjoined segments to a minimum cross-section at a line substantially remote from the conjoined segments.

2. An oil control piston ring for a piston having a ring groove with oil drainage passages comprising,
   (a) a flexible spring type oil ring of U-shaped section with axially spaced cylinder-engaging lands slotted in an alternate manner circumferentially from the outer cylinder-engaging edge of each land to the opposite land to provide gaps in staggered relation opening first in one land and then in the other around the ring and separating said lands into individual segments,
   (b) struts defined by spaced apertures and directly connecting a segment in one land with a segment in the other land,
said spaced apretures extending from a top land to a bottom land to define a U-shaped structure in which the legs of the U-shaped structure are struts and the bight of the U-shaped structure a part of one of said segments wider than said struts adjacent the junction between segments and struts, and said struts being longer than said part of said segment between struts and variable in section between one segment and an opposite segment to distribute the forces imposed on said ring when compressed circumferentially, and the circumferential dimension of the apertures between adjacent struts being non-uniform so that the length of the part of said segments between certain pairs of struts is greater than the length of such part between other pairs of struts.

3. An oil control piston ring for a piston having a ring groove with oil drainage passages comprising,
(a) a flexible spring type oil ring of U-shaped section with axially spaced cylinder-engaging lands slotted in an alternate manner circumferentially from the outer cylinder-engaging edge of each land to the opposite land to provide gaps in staggered relation opening first in one land and then in the other around the ring and separating said lands into individual segments,
(b) struts defined by spaced apertures and directly connecting a segment in one land with a segment in the other land,
said spaced apertures extending from a top land to a bottom land to define a U-shaped structure in which the legs of the U-shaped structure are struts and the bight of the U-shaped structure a part of one of said segments wider than said struts adjacent the junction between segments and struts, and said struts being longer than said part of said segment between struts and variable in section between one segment and an opposite segment to distribute the forces imposed on said ring when compressed circumferentially, and the circumferential dimension of the apertures between struts decreasing progressively toward the split ends of said ring to vary the spacing between struts and thereby the length of a part of said segments between pairs of struts is varied to distribute the loading due to circumferential compression of said ring thereby holding a more uniform gap around the ring and more uniform flexibility.

4. An oil control piston ring for a piston having a ring groove with oil drainage passages comprising,
(a) a flexible spring type oil ring of U-shaped section with axially spaced cylinder-engaging lands slotted in an alternate manner circumferentially from the outer cylinder-engaging edge of each land to the opposite land to provide gaps in staggered relation opening first in one land and then in the other around the ring and separating said lands into individual segments,
(b) struts defined by spaced apertures and directly connecting a segment in one land with a segment in the other land,
said spaced apertures extending from a top land to a bottom land to define a U-shaped structure in which the legs of the U-shaped structure are struts and the bight of the U-shaped structure a part of one of said segments wider than said struts adjacent the junction between segments and struts, and said struts being longer than said part of said segment between struts and variable in section between one segment and on opposite segment to distribute the forces imposed on said ring when compressed circumferentially, the segments in the upper land of said ring being of less radial width than the segments in the lower land of said ring, and said struts being inclinde radially outward of said ring from bottom to top.

References Cited

UNITED STATES PATENTS

| 3,024,029 | 3/1962 | Brenneke | 277—78 X |
| 3,050,354 | 8/1962 | Marien | 277—188 |

FOREIGN PATENTS

| 459,171 | 8/1950 | Italy. |
| 61,601 | 8/1948 | Netherlands. |

LAVERNE D. GEIGER, *Primary Examiner.*

J. S. MEDNICK, *Assistant Examiner.*

U.S. Cl. X.R.

277—169, 200, 206

UNITED STATES PATENT OFFICE
CERTIFICATE OF CORRECTION

Patent No. 3,447,811                                                                                           June 3, 1969

George C. Mayfield

It is certified that error appears in the above identified patent and that said Letters Patent are hereby corrected as shown below:

Column 2, line 25, cancel "for"; line 32, "well-know" should read -- well-known --. Column 3, line 29, after "is" insert -- of --; line 46, "seatng" should read -- seating --; line 72, after "also" insert -- both --. Column 4, line 5, "tion" should read -- tions --; line 8, "narrow" should read -- narrower --; line 45, "described" should read -- describes --; line 48, after "some" insert -- effect --. Column 5, line 13, after "of" insert -- the --. Column 6, line 9, "When" should read -- Where --; same line 9, "froce" should read -- force --; line 32, "separting" should read -- separating --. Column 8, line 23, "inclinde" should read -- inclined --.

Signed and sealed this 21st day of April 1970.

(SEAL)
Attest:

Edward M. Fletcher, Jr.                                      WILLIAM E. SCHUYLER, JR.
Attesting Officer                                                     Commissioner of Patents